E. A. DIETERICH.
EGG CARRIER.
APPLICATION FILED MAR. 14, 1913.
1,074,415.
Patented Sept. 30, 1913.
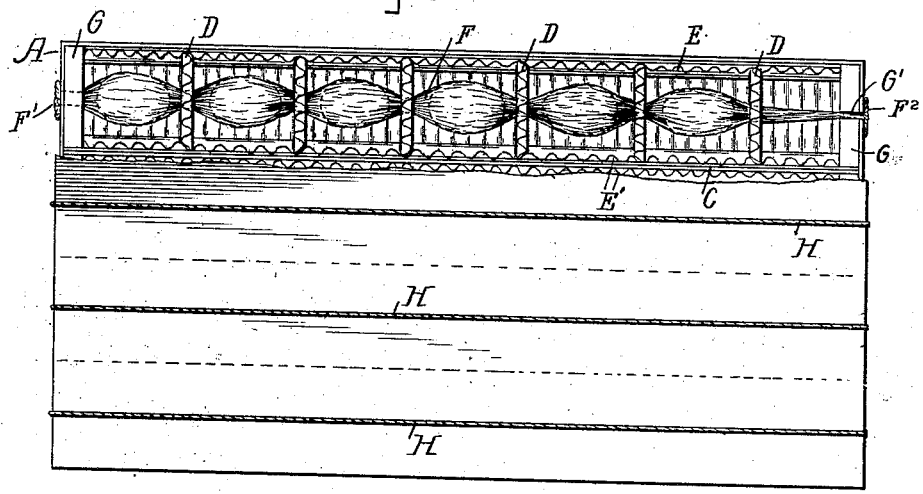
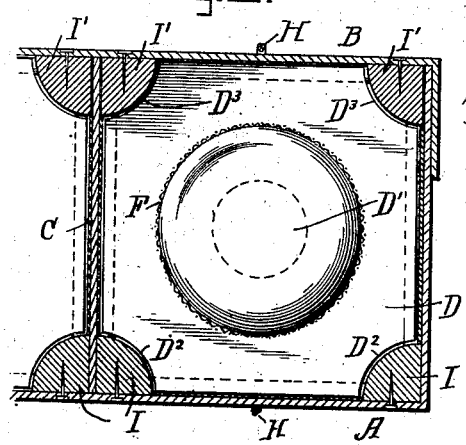
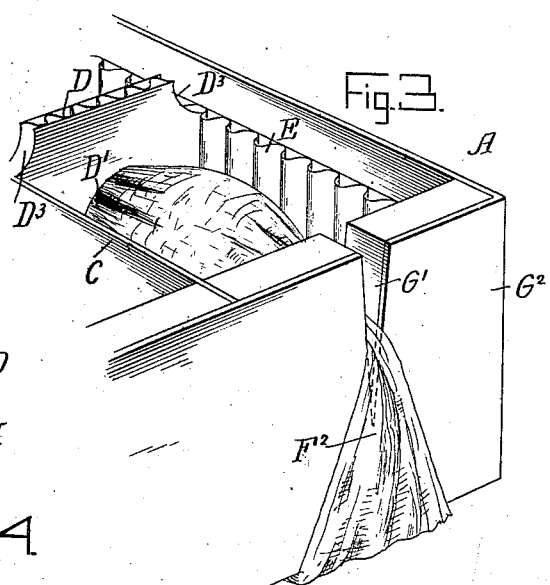
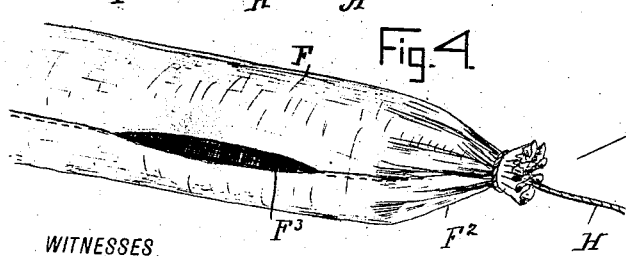
WITNESSES
INVENTOR
Edward A. Dieterich
BY
ATTORNEYS

UNITED STATES PATENT OFFICE.

EDWARD A. DIETERICH, OF NEW YORK, N. Y.

EGG-CARRIER.

1,074,415.  Specification of Letters Patent.  Patented Sept. 30, 1913.

Application filed March 14, 1913. Serial No. 754,227.

*To all whom it may concern:*

Be it known that I, EDWARD A. DIETERICH, a citizen of the United States, and a resident of the city of New York, borough of the Bronx, in the county and State of New York, have invented a new and Improved Egg-Carrier, of which the following is a full, clear, and exact description.

The object of the invention is to provide a new and improved egg carrier arranged to effectively protect the eggs against being broken while in transit especially when forwarded by parcel post.

In order to accomplish the desired result, use is made of a receptacle, such as a box, crate, or the like provided with individual cells and flexible means for yieldingly suspending the eggs one within a cell.

A practical embodiment of the invention is represented in the accompanying drawings forming a part of this specification, in which similar characters of reference indicate corresponding parts in all the views.

Figure 1 is a plan view of the egg carrier, part of the cover being broken out; Fig. 2 is an enlarged cross section of a portion of the same; Fig. 3 is an enlarged perspective view of one corner of the egg carrier with the cover removed; and Fig. 4 is a perspective view of one end of the egg-carrying tube.

The egg carrier shown in the drawings is in the form of a box A having twenty-four cells each adapted to contain an egg, but it is evident that the box may contain more or less cells, and the carrier may be in the form of a crate or box having tiers of cells. The box A is adapted to be closed by a removable cover B and the box is provided with longitudinal and transverse partitions, C D so as to form cells arranged in longitudinal rows. The front and rear of the box are provided at their inner faces with vertically-disposed corrugations E and similar corrugations E' are arranged on the faces of the longitudinal partitions C to provide vertical guideways for removably holding the partitions D in place, as plainly indicated in Figs. 1 and 3. By engaging the partitions D with the different corrugations individual cells can be made of more or less length to suit the length of the eggs to be carried.

Through each row of cells extends a holder or support in the form of a tube F of cheesecloth or other suitable fabric material the tube being fixed at one end F' to one end G of the box A, and the other end $F^2$ of the tube F is adapted to be engaged with a V-shaped clamping slot G' formed in the other end $G^2$ of the box A so as to hold the tube F stretched within the row of cells. Each of the partitions D is provided at or near its middle with an opening D' somewhat less in diameter than the diameter of the eggs to be carried so that when the eggs are in position in the tube, one at each cell, then the tube is contracted at the partitions owing to the tube passing through the reduced openings D' so that the eggs are securely held against longitudinal movement in the tube and are held suspended within the cells without contacting with the inner surfaces of the cells.

In using the device the partitions D are removed from their guideways, and the end $F^2$ of the tube F is held detached from the slot G' to permit of filling one egg into the tube, preferably through a slot $F^3$ formed near the end $F^2$. This egg is pushed along the tube until it is close to the side G of the box A, and then the first partition D is threaded onto the end $F^2$ of the tube and pushed along the tube until within a short distance of the egg in the tube, after which the partition D is inserted in the corresponding corrugations E, E'. The second egg is now passed into the tube and pushed forward to within a short distance of the inserted partition D, and then the second partition D is threaded on the tube F and pushed forward thereon to within a short distance of the second egg, and then this second partition is engaged with the corrugations E'. This operation is repeated until the desired number of eggs for one row are filled into the box together with the partitions D. When this has been done the end $F^2$ of the tube F is drawn firmly into the slot G' to hold the tube F in stretched condition in the row of cells.

The above described operation is repeated in connection with each of the tubes so that the desired number of eggs are suspended within the cells of the box, and then the cover B is placed in position to close the box. The end $F^2$ of the tube F is preferably provided with a string H adapted to be passed around the box and over the cover B to be tied at any convenient point to hold the tube F positively in stretched condition and to hold the cover B in position on the box.

The box B is preferably strengthened or reinforced at the bottom by longitudinally-extending bars I, as plainly indicated in Fig. 2, the partitions D having their bottom corners cut out as indicated at D' to fit the reinforcing bars. Similar bars I' are attached to the cover B to fit the box at the longitudinal partition C as well as the front and back of the box, and the upper corners of the partitions D are cut out as at D³ to fit the said reinforcing bars I'.

The box constructed in the manner described is exceedingly strong and durable, and by suspending the eggs within the individual cells by the use of a tube of a flexible material, it is evident that the eggs are not liable to be broken while in transit especially when forwarded by parcel post.

In practice the bottom of the box as well as the cover B are provided with corrugations registering with the corrugations E so that the lower and upper ends of the partitions D fit into the said bottom and cover corrugations to aid in securely holding the partitions in place.

Having thus described my invention, I claim as new and desire to secure by Letters Patent:

1. An egg carrier, comprising a box having a slot in one end and provided with partitions dividing it into a plurality of cells, each partition having an opening therein, a cover for the box, a tube of flexible material threaded through the openings of the partitions and adapted to contain the eggs, one in each cell, said tube being secured to one end of the box and having its other end passed through the slot of the box, and a cord secured to the projecting end of the tube and wrapped around the box and its cover.

2. An egg carrier, comprising a box having a removable cover and provided along the inner faces of the sides with vertically-disposed corrugations, transverse partitions removably held in the corrugations and having central openings and cut-out corners, stiffening rods on the bottom and sides of the box and fitting the cut-out portions of the bottom corners of the partitions, and stiffening rods in the cover and fitting into the top cut-out corners of the partitions.

In testimony whereof I have signed my name to this specification in the presence of two subscribing witnesses.

EDWARD A. DIETERICH.

Witnesses:
THEO. G. HOSTER,
PHILIP D. ROLLHAUS.

---

Copies of this patent may be obtained for five cents each, by addressing the "Commissioner of Patents, Washington, D. C."